US010077908B2

(12) United States Patent
Isaacson

(10) Patent No.: US 10,077,908 B2
(45) Date of Patent: Sep. 18, 2018

(54) METHOD FOR HEATING AND/OR COOLING OF BUILDING INTERIOR BY USE OF VARIABLE SPEED PUMP, PROGRAMMABLE LOGIC CONTROLLER, AND TEMPERATURE SENSORS AT HEATING/COOLING INLET AND OUTLET FOR MAINTAINING PRECISE TEMPERATURE

(71) Applicant: Nissim Isaacson, Inwood, NY (US)

(72) Inventor: Nissim Isaacson, Inwood, NY (US)

(73) Assignee: US PUMP CORP., Inwood, NY (US)

( * ) Notice: Subject to any disclaimer, the term of this patent is extended or adjusted under 35 U.S.C. 154(b) by 440 days.

(21) Appl. No.: 14/563,389

(22) Filed: Dec. 8, 2014

(65) Prior Publication Data

US 2016/0161142 A1    Jun. 9, 2016

(51) Int. Cl.
*F24F 11/06*     (2006.01)
*G05D 23/00*     (2006.01)
*F24D 19/10*     (2006.01)

(52) U.S. Cl.
CPC ........ *F24D 19/1012* (2013.01); *Y02B 30/745* (2013.01); *Y02P 80/156* (2015.11)

(58) Field of Classification Search
CPC .............. Y02B 30/745; F24D 19/1006; F24D 19/1003; F24D 19/1009; F24D 19/1024; F24D 19/1033
USPC ........................................ 165/247, 244, 300
See application file for complete search history.

(56) References Cited

U.S. PATENT DOCUMENTS

| | | | | |
|---|---|---|---|---|
| 3,202,208 | A * | 8/1965 | Geiringer | F24D 19/1012 165/219 |
| 4,714,821 | A * | 12/1987 | Jakobsson | F24D 11/002 126/400 |
| 6,467,537 | B1 * | 10/2002 | Bujak, Jr. | F24F 3/06 165/208 |
| 8,201,750 | B2 * | 6/2012 | Sambrook | F24D 19/1009 165/247 |
| 2004/0065095 | A1 * | 4/2004 | Osborne | F24F 3/00 62/160 |
| 2008/0110416 | A1 * | 5/2008 | Gelderloos | F24H 1/36 122/18.3 |
| 2008/0314807 | A1 * | 12/2008 | Junghanns | B01D 61/025 210/85 |
| 2010/0032150 | A1 * | 2/2010 | Determan | F28D 15/0266 165/246 |
| 2010/0064714 | A1 * | 3/2010 | Tashiro | H05K 7/20745 62/259.2 |

(Continued)

*Primary Examiner* — Jason Thompson
(74) *Attorney, Agent, or Firm* — Andrew S. Langsam; Pryor Cashman LLP

(57) ABSTRACT

A method for heating and cooling building interiors with a boiler and/or chiller of fluid travelling in a closed loop includes temperature transducers located at the inlet and outlet of the boiler and/or chiller. A Variable Frequency Drive pump and closed loop piping for transporting the fluid is necessarily provided. The temperature transducers at the outlet and inlet of the boiler and/or chiller are electrically connected to a PLC or pump logic control device for receiving information from the transducers and altering the speed and/or frequency of operation of the pump or set of circulating pumps to create an ideal temperature differential of about 20 degrees C. between the outlet and the inlet.

4 Claims, 3 Drawing Sheets

(56) References Cited

U.S. PATENT DOCUMENTS

2011/0028227 A1* 2/2011 Dubois .................. A63G 21/18
                                                472/117
2011/0276288 A1* 11/2011 Hsieh .................. F24D 19/1009
                                                702/60

* cited by examiner

METHOD FOR HEATING AND/OR COOLING OF BUILDING INTERIOR BY USE OF VARIABLE SPEED PUMP, PROGRAMMABLE LOGIC CONTROLLER, AND TEMPERATURE SENSORS AT HEATING/COOLING INLET AND OUTLET FOR MAINTAINING PRECISE TEMPERATURE

FIELD OF THE INVENTION

The present invention relates to a heating and/or cooling system for residential, commercial, industrial areas, etc., which uses a heating and/or cooling mechanism for heating and/or cooling water and then circulating the same within closed water pipes for subsequent radiation into the area sought to be heated or cooled. Preferably, according to the invention, a driving water pump is used to deliver the heated and/or cooled water through interior piping, with the temperature of the water precisely controlled to a difference or Delta T, of about 20 degrees Fahrenheit, as between the input into the heating and/or cooling boiler or chiller and the output. Other heating and cooling mechanisms besides boilers and chillers, of course, can be adapted with the subject invention but, for present ease of illustration, the invention is described with respect to boilers of the residential type and chillers. The invention, of course, is defined by the claims, and is not meant to be limited by the preferred examples and specific description of examples. The Delta T (preferably 20 degrees F.) is preferably adjusted by use of temperature transducers preferably located at the input and output of the boiler and/or chiller (but can also contemplate extension to other locations within the closed loop assuring proper heat transfer regardless of any obstructions and piping design) of the boiler/chiller mechanism and providing electronic signals of the temperature and the temperature difference to a Pump Logic Control Unit (PLC) which provides driving signals (electrical and/or electronic) to the pump or pumps, preferably Variable Fluid Drives, so that the pumps operate at their maximum efficiency.

The present invention seeks to increase efficiency of the overall heating and/or cooling system, by use of at least a pair of temperature transducers preferably located at the input and output of the heating and cooling ends of the temperature changing mechanisms. The signals from the transducers are used to operate the PLC and the VFDs of the pumps and to raise or drop the temperature of the water and/or speeding up or slowing down the VFDs of the system. Maximum efficiency is sought and believed achievable by use of the temperature transducers to sense and control the PLC and to maintain the Delta T of the system at or about 20 degrees F.

The overall system of the present invention is for heating and cooling interiors (commercial, industrial, residential, etc.) and is designed to increase efficiency of the use of VFD pump(s) and the efficiency of heat transfer in the system. Specifically, the system improves efficiency by obtaining and directing signals to a controller and adjusting the temperature difference between the water leaving the boiler/chiller, at the preferred location of the driving pump(s) and of that returning to the heating/cooling mechanism, i.e., back to the pump(s) so that the temperature difference is maintained at a point (preferably 20 degrees F.) that allows the pump(s) to operate at their optimal level of efficiency which is based on the speed of fluid flow within the system, directly coordinated to the speed of pumping the same through the closed loop system by the pump(s). The present inventive system achieves increased efficiency by use of a temperature transducer attached at the incoming flow of the water into the boiler and/or chiller which measures the temperature of the water that is returning to the boiler/chiller. The system also comprises a temperature transducer at the exit flow of the pump(s) of the boiler/chiller that measures the temperature of the water as it is leaving the boiler/chiller. Both temperature transducers communicate with an electronic and/or electrical pump logic control unit (PLC), which collects and interprets the information from the temperature transducers and alters the pump(s) speed (variable fluid drive pumps are preferably used) based on the Delta T information and other variables, for example, time of day, persons within the building, expected weather conditions, etc. The point being one can use multiple inputs in addition to that of Delta T to create a highly efficient drive of the pumping of fluid or preferably water through the system, desirably providing an ideal temperature differential. In other embodiments, the system incorporates not only temperature differentials between heater/chiller input and output of water, but also the specific efficiency of the flow curve of the particular variable drive pump(s) to most efficiently provide the ideal pump(s) flow and maximum thermal efficiency for the space being heated/cooled and maximizing the efficiency from an electrical power consumption perspective of the pump(s).

BACKGROUND OF THE INVENTION

Heating and cooling systems are a vital part of any dwelling, whether it be a home or a place of business. Most commonly, heating and cooling systems involve multiple parts that heat or cool a liquid, preferably water transport the liquid, and carry the liquid through the building, thereby heating or cooling the desired area. For ease of illustration and understanding, the present invention is generally described in terms of heating an area but, of course, it should be easily appreciated by those of skill in the art that the same teachings taught herein are generally also applicable to chilling systems. Usually area heating systems or components comprise a furnace or boiler, a motorized pump for driving the heated water through pipes into the area to be heated for radiation therein, and piping throughout the building and/or area to be heated. In some cases, and for the purposes for this invention, the vapor in the system is heated water and/or steam which is superheated in a boiler, and connected to a pump which pushes the water out of the boiler and through the piping in the building for radiation therein. The piping is a closed looped system which circulates the water throughout the building, carrying the superheated (or cooled) water to each room and dissipating the heat but, after use circulating, transmitting the cooler (or heated) water or vapor back to the boiler for reheating or rechilling.

The water or other vapor will lose heat once it leaves the boiler and pump though the pipes and radiators. Therefore, the vapor must be returned to the boiler and be reheated (or cooled) and repumped through the system continuously if the system is going to continue to maintain the desired set point of the area sought to be heated or cooled. Of course, the heating and/or cooling is generally at contrary positions to the outside environment, i.e., the current weather conditions. To make this heating and chilling systems somewhat efficient and utile, piping in buildings are located and placed to form a continuous loop such that the water that leaves the pump and travels through the areas to be heated or chilled will be returned to the boiler or chiller for reheating (or rechilling) and then the pump(s) are used for recirculation within the same closed loop system.

These systems are not perfect, however. The pumps themselves require a great deal of electrical energy to pump the water throughout the building. With the cost of energy and operating continually rising, and with buildings getting ever larger, the efficiency of system is a growing and important concern in the efficient and economical operation of an area occupied by humans. Existing systems have used a pressure transducer as a sensor and input to a PLC to control the speed of the VFD pumps providing less energy consumption of the motors/pumps. The present invention not only addresses energy consumption of the motors/pumps but also heat transfer which is a much greater part of the thermal solution. Of course, lowering the speed of the pump(s) due to pressure drop will save energy of consumption at the boiler or chiller but the heat transfer component is by far is the most important factor to save the most energy in any given system and the use of two or more temperature transducers to adjust the VFD pumps is more of a significant factor to the solution, provided by the present invention.

To run at peak efficiency, electrically driven pumps must run at an exact flow rate (or frequency) that will be most efficient for both fluid flow and electrical energy consumption. If the pump is working at too high a flow rate or frequency, it may be using more energy than is necessary and is wasting i.e., overly consuming energy. If the pump is working at too low a flow rate or frequency, it must run longer to achieve the desired temperature to the living space which again is wasting electrical energy because the pump (s) are not operating at their maximum efficiency. Unfortunately, the ideal frequency or pump flow rate for maximum electrical efficiency and water flow (heated and/or cooled) is not easily known and varies for every pump and surely varies for multiply connected or ganged pumps. To make matters more difficult, the correlation between frequency and flow rate is not linear either, and as a result the ideal frequency can be difficult to calculate and maintain. To help calculate and maintain the ideal or most efficient frequency of driving a pump, some systems employ variable frequency drives. Variable frequency drives, or VFDs, are devices which will determine a specific pump's frequency-to-flow rate curve and adjust the electrical frequency accordingly. Because VFDs can adjust pump frequency to create the desired fluid flow, they can greatly improve a heating and/or chilling system's efficiency and energy consumption—by controlling the efficiency of the driving pump(s). For this reason VFDs have become popular in the heating and chilling industry.

Even with VFD's and adjusted pump flows, many systems continue to work inefficiently. This is because VFDs only maximize the efficiency of the pump(s), while the boiler or chiller continues to work at an inefficient rate. Yet, boilers and chillers in heating and cooling systems, are believed to be most efficient when the water coming back and into the boiler and chiller has a difference of about twenty degrees Fahrenheit from the water being distributed (after reheating or rechilling in the boiler or chiller) by the pump(s). If the temperature of the water re-entering the boiler is excessively far from that of water already being heated in the boiler, the boiler will experience thermal stress which could damage it. Of course, some systems have primary secondary loops which try to minimize the thermal stress to the boiler but the present invention is believed to be even more effective at reducing thermal stress. If the temperature of the returning water is too close to the temperature of the water already in the boiler, the boiler will not properly operate either. Both of these circumstances translate to wasted energy and an inefficient heating/cooling system.

While some systems exist that measure the temperature of the vapor in the boiler system, there are no current systems that measure the temperature differences specifically in relation to the boiler and to use that information as input signals to an electronic/electrical PLC which controls the pump and/or a set of pumps at their maximum efficiency. Instead, some of the systems that measure temperature measure only do so inside of the boiler. Other systems use temperature sensing in multiloop systems where the boiler exists in one loop of piping that is connected to a second or more distributing loops where the second loops obtain heat (or cooling) via heat transfer between the main and the secondary loops. In those cases the temperature transducers are on the loop separate from the boiler. Because that is not necessarily the coolest location of the system, the temperature transducer located in the secondary loops will not indicate whether the pump(s) are moving too fast or too slow, i.e., at or not the efficient frequency. Those temperature transducers will only provide data points of the temperature of the water in the secondary loop. In contrast, the present invention contemplates the use of two temperature transducers at the input and output of the primary boiler and directs and feeds that information into the PLC for efficiently controlling the frequency and speed of flow of the VFD pumps of heated fluid.

The problems raised by heating and cooling systems today, plus the rising cost of fuel and the growing sizes of buildings, create a need for a device or system that will maintain a boiler at an optimal level of a twenty degree temperature difference between the incoming and outgoing water temperature of the boiler. It would further be advantageous to combine this feature with the VFD technology (using one or more VFD pumps operating at their maximum efficiency which can be accomplished by use of programmed pump curve efficiencies stored in the memory of the PLC) to create an entire system that maximizes both the boiler and the pump(s) to function as economically and efficiently as possible. The present invention is directed to providing a system for heating or cooling building interiors that monitors the temperatures (via temperature transducers) of water as it enters and exits the boiler and adjusts the pump flow rates of VFD pump(s) via a PLC based on that information to maintain an ideal temperature differential. This will greatly improve the efficiency of the heating and cooling systems and hopefully minimize those operating costs. In addition, more advanced embodiments of the invention will adjust the pump output based on the maximum efficiency of the flow curve of the specific pump(s) being used to more completely optimize the system and save the maximum amount of energy and monetary funds possible.

DESCRIPTION OF PRIOR ART

To the Applicant's knowledge, no heating and cooling systems exist that monitor via temperature transducers the exit and return (output and input) temperature of water or fluid in the primary boiler or chiller system and that adjust the pump flow rate or frequency to maintain a preferred Delta T or difference between these two temperatures at which the system is most efficient. Thus, it is advantageous to provide such a system that contains all of these features for the purpose of efficiently heating and cooling and reducing operating costs.

To the Applicant's knowledge, there are current heating systems which use VFD pumps and a PLC for controlling the same but the PLC is fed information from pressure transducers, not temperature transducers as in the present invention. The use of temperature transducers at the output and input of the primary boiler for determining and maintaining a Delta T of about 20 degrees C. is desired and the use of the Delta T, as sensed, via the PLC for operating the VFD pump(s) is an important aspect of the present invention. It is nowhere shown nor suggested by the known prior art.

SUMMARY OF THE INVENTION

The present invention is directed to a system for heating and/or cooling an area, preferably the interior of a residential, commercial, industrial building involving a primary mechanism for first heating or cooling water, i.e., a boiler (gas or oil or even coal fired) or a chiller for water or fluid. These systems generally employ a network of interconnected closed circuits of piping (preferably copper) with radiator stations for allowing the heat of the contained water or steam to warm the air in that location. To maintain the temperature, against the force of Mother Nature, a supply of heated (or cooled) water or steam is used. A pump for pumping water from the boiler or chiller is used for transmitting the heated (or cooled) water or fluid through the continuous or closed circuits of piping.

According to the present invention, a pair of temperature transducers that measure the temperature of the water as it enters and exits the heating mechanism (or chilling) and provides a signal of that information to a Pump Logic Control is used. Preferably, it is an aspect of the present invention to maintain a Delta T or temperature differential between the entering temperature of the water or fluid into the boiler and the exiting temperature of the water or fluid out of the boiler at or about 20 degrees F. The temperature transducers used at both the input and output of the boiler system transmit electrical signals to the PLC and it preferably alters the frequency or speed of the pump(s) based on the difference in temperature between the two temperature transducers and the efficiency curves of the pump(s).

The mechanism for heating or cooling the water, i.e., the primary loop can be any known mechanism such as oil, gas, coal, boilers or chillers used widely already in the field or to be assembled in new installations. Attached to the primary mechanism is closed circuit piping, typically made of copper (although not necessarily) that extends throughout the interior of the building, thereby circulating the heated or cooled water around the building, dissipating heat or cold as the warmth or cooling of the pipe radiates the same. The piping circles back to the boiler or chiller for the water (with reduced temperature in the case of heating or increased temperature when the piping is transmitting coolness) to be reheated, rechilled, i.e., reprocessed and recirculated throughout the building. To move the heated or chilled water through the pipes, the system involves one or more water pumps connected to the boiler and to the piping. In the inventive system, temperature transducers are placed at or near the outflow outlets of the boiler or cooler and at or near the outside of the inflow outlets of the water back to the boiler. Standard temperature transducers can be used i.e., available temperature sensors which convert the temperature sensed into an electrical signal. Because the temperature transducers are local to the pump(s) and boiler, they are therefore most accurately able to measure the temperature of water related to the pump and boiler rather than the entire system. Determining the difference in temperature between these two points is very valuable for system efficiency because the boiler is believed to work at its maximum efficiency when the water entering and exiting is at a specific temperature differential, i.e., when there is a Delta T or difference of twenty degrees C. between the two sensing points. To maintain the ideal temperature differential, in the present invention, the temperature transducers communicate with a pump logic control or PLC that will calculate the difference in the temperatures taken by the two temperature transducers. The PLC also communicates with the water pump(s), preferably VFDs, to control the frequency driving the pump and thus the speed of the pump, adjusting it to pump at a flow rate that will cause the overall system to reach the ideal temperature differential (in the range of about 20 degrees F.) between the water entering and exiting the boiler. Because a heating and chilling system operated by a water pump or two or more ganged together pumps works most efficiently at a specific temperature differential, usually twenty degrees above or below the measured input and output at the primary boiler/chilling loop, calculating and maintaining ideal temperature differentials will enable the boiler or chiller to work most efficiently, along with the efficiency of operation of the VFD pumps, all to greatly reduce the amount of energy the overall system consumes. Additionally, the PLC of the preferred embodiment of the system also takes into account the flow curvature of the specific pump(s) involved using variable frequency drives. Because flow rate does not linearly correspond to the frequency or energy consumption of any given pump, considering the specific correspondence that flow has to these variables in a given system using the variable frequency drive will enable the system to more accurately, and therefore efficiently, reach the desired flow level to maintain the ideal temperature difference.

DETAILED DESCRIPTION OF THE INVENTION

The Preferred Embodiment and the Figures

Figure 2:
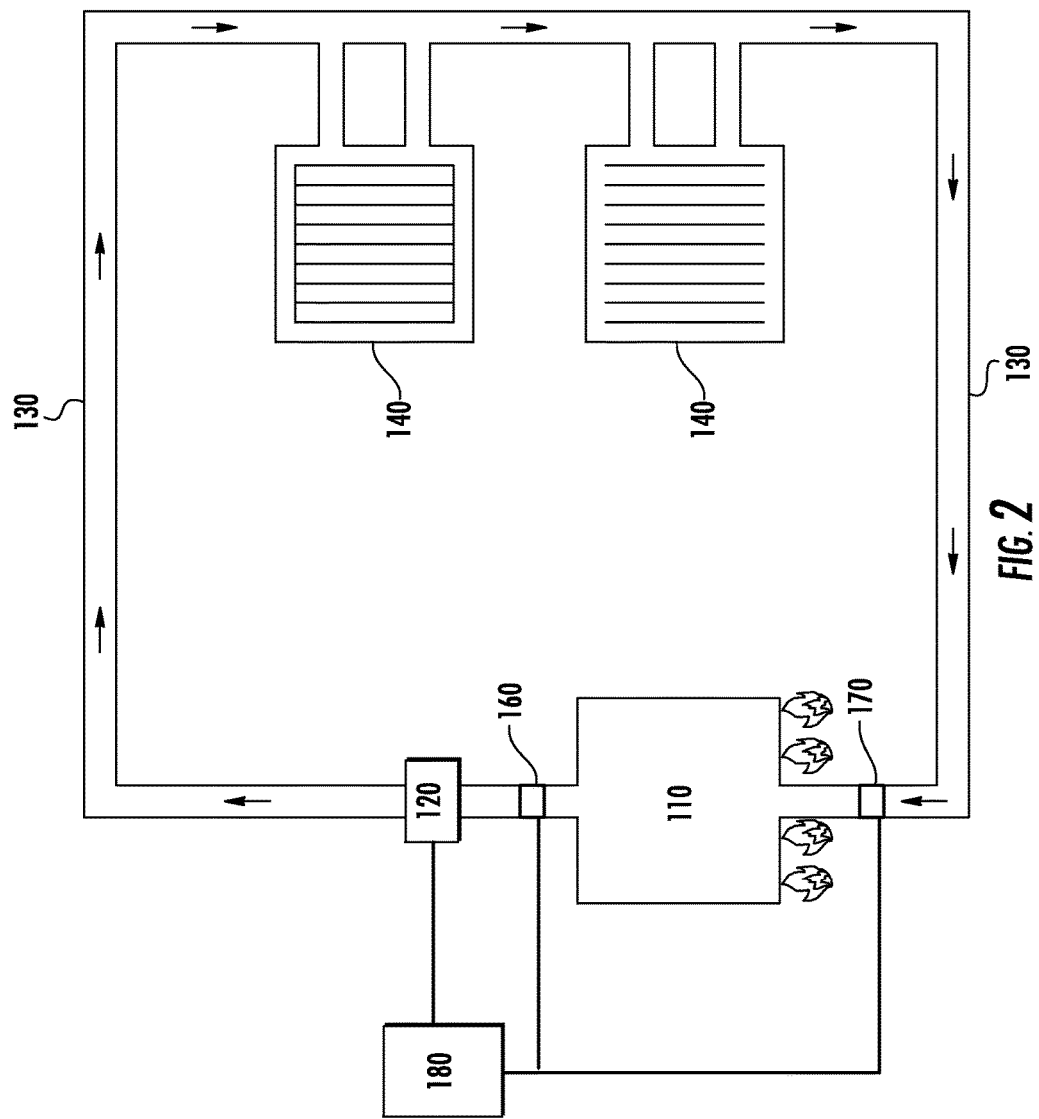
FIG. 2 is a schematic illustration of a simplified version of the inventive heating and cooling system which uses a pair of temperature transducers at the input and output ends of the boiler. The VFD pump is controlled by the PLC which uses the efficiency curve of the pump to advantage. This Figure also show the boiler, the pump, the closed loop of piping through which heated vapor travels, and a representative radiator. The PLC or pump logic control is provided with resident information (i.e., it is pre-programmed) with the precise VFD curve for maximizing the efficiency of the pump so as to control the frequency and thus the speed of the pump consistent with its known efficiency of operation. A pair or more of such VFD pumps can similarly be operated to maximize their efficiency of operation.
Figure 3:
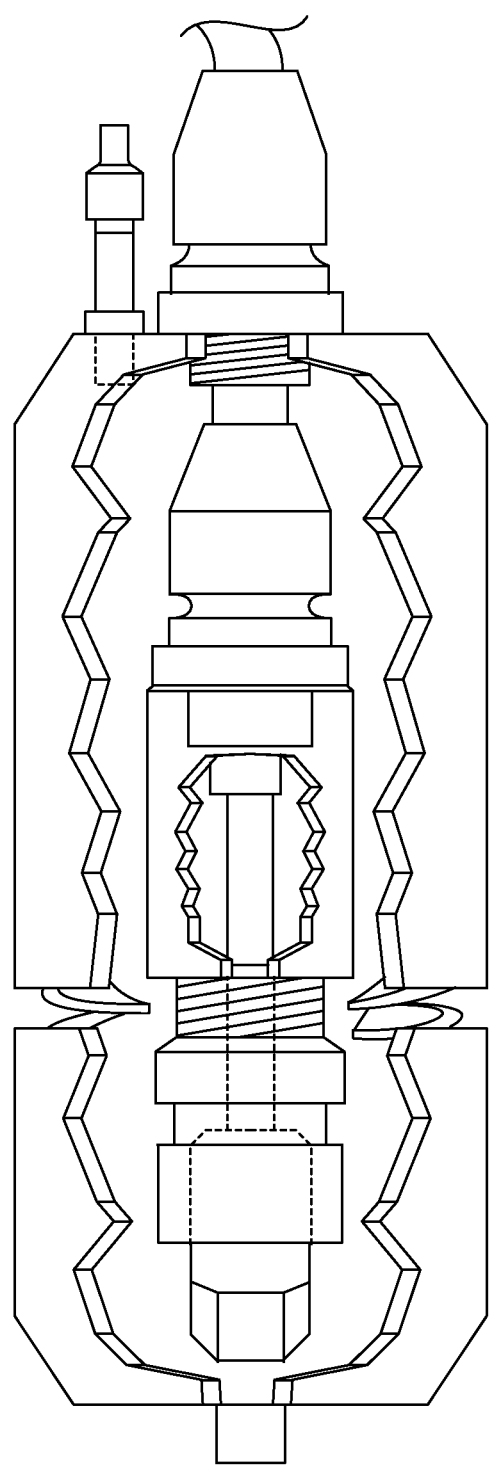
FIG. 3 is a side cross sectional view of a suitable temperature transducer as might be used in the disclosed invention and shows the interior workings of the device.

Description will now be given of the invention with reference to the attached FIGS. 1-3. It should be understood that these Figures are exemplary in nature and in no way serve to limit the scope of the invention, as the invention will be defined by the claims, as interpreted by the courts in an issued U.S. patent.

Figure 1:
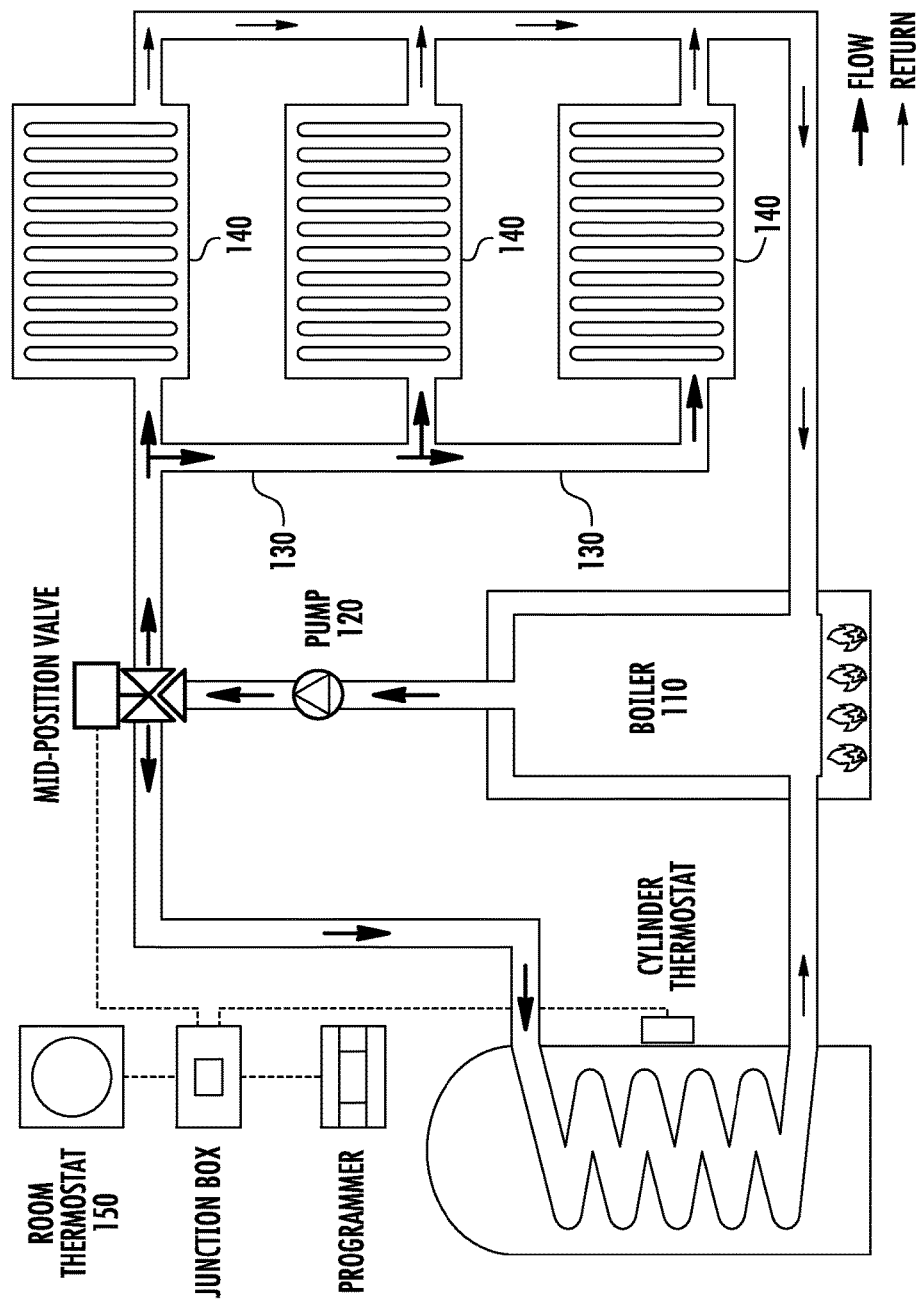
FIG. 1 is a schematic illustration of a standard heating system that shows the primary loop, a water or steam boiler, a circulating pump, the closed circuit of heated water-carrying piping (secondary loop) through which heated vapor travels, controllers for the systems, and the radiators which radiate heat into a room.

FIG. 1 illustrates a typical and conventional heating and/or cooling system for the interior of a building. In the illustrated embodiment, however, the system best illustrates a heating system as a boiler is provided, element 110, not a chiller. The system consists of a boiler or cooler 110 (hereinafter referred to as boiler 110, although it should be understood that either a boiler or a cooler will be appropriate) which heats or cools water or fluid, a circulating pump 120 which pumps the processed and heated water through a closed circuit of (preferably copper) pipes 130, and a system of radiators 140 which dissipate or radiate the heat from the copper piping throughout the room(s). The arrows in the Figure show the direction of water flow. As can be seen in the Figure, the system works when water is heated or superheated in a boiler 110 and then is sucked and forced from the boiler 110, by the pump 120, which then pushes or transmits the heated water through the copper pipes 130. When the water travels through the pipes, it reaches the desired rooms of the building and then, since the pipes are a closed loop or circuit, the water is eventually returned to the boiler 110 to be reheated and circulated again. Of course, as the room being heated is being cooled by weather conditions, it will be necessary for heated water to be continuously or semi-continuously provided to the radiators. If the desired temperature of the environment sought to be heated is reached, generally, the boiler is shut down and the pump is in the "off" position. As temperature drops, due to weather or other conditions, the thermostat 150 will sense the same, and the boiler activated, to heat a new "batch" of water, passing the same throughout the rooms via the piping 130, all as a consequence of the pump 120 driving the same. The radiators 140 will disperse the heat from the water in the pipes and the air in the room will receive the heat.

Once the water leaves the boiler of the system, it will due to weather, other conditions, lack of complete insulation, etc. begin to drop and/or start to match the temperature of its surroundings, however. This loss of heat is due to basic thermodynamics. Heat in a closed system, in this case piping and the building, will scatter to create equilibrium (uniform temperature) throughout the system. Thus, the superheated water in the pipes will dispel its heat to the surrounding rooms and the building and water will approach equal temperatures. Water, like all substances, will lose or gain temperature based on both the amount of time it is in a system of a different temperature and the difference between its temperature and that of its surroundings. This is all based on standard and well-known thermodynamics. As a result, by the time the water returns to the boiler 110 after it has traveled through a colder relative environment of the building, it is inevitable that its temperature within the piping will have changed to become closer to that of the rooms it is heating. This, of course, assumes a colder environment in comparison to the temperature of the water within the pipes and the thermal transfer of the heat from the water through the piping into the air of the rooms of the building.

As can be seen in the illustrated in FIG. 1, the room thermostat is an electrical control, connected to a junction box, which is also connected to a programmer so that the desired temperature can be adjusted, as desired, based on a variety of well-known factors, e.g., day of week, time of day, etc. The room temperature is sensed by the room thermostat 150 and it compares the same to the desired temperature, as dictated by programmable device, 200, and when the room is too cold in comparison to the desired temperature, a signal is sent to the cylinder thermostat which senses the temperature of the water passing through the boiler and controls the boiler's on and off positions. A valve is provided for diverting the bulk of the heated fluid to the pipes 130 with a small quantity of the water to the cylinder thermostat so that the temperature of the boiler is sensed, too, and controlled.

If the temperature has changed too much or too little, the heating system, specifically the boiler, will run inefficiently. This can create a problem for the system because if the boiler is inefficient, it will require additional energy, raising operating costs. Also, if the temperature of the water entering the boiler is excessively far from that of water already in the boiler, the boiler will experience thermal stress which could damage the boiler over time, resulting in cracks, breaks, etc. However, if the temperature of the returning water is too close to the water in the boiler, the boiler will also not operate efficiently. The ideal difference in temperature is about twenty degrees Fahrenheit and maintaining this temperature is one of the best ways to maintain boiler efficiency and condition.

Seeing that temperature changes are dependent on time and other factors, altering the amount of time that the water is outside of the boiler will control how much heat is lost. This can be done by altering the speed at which the water travels through the piping of the heating system which can be done by changing the frequency provided by the electrical supply to run the pump. This is capable of being done by VFD pump(s). If the pump runs faster, the water will be exposed to different temperatures for a shorter period of time and therefore will return to the boiler closer to the temperature at which it left. On the other hand, if the pump runs slower, the water will be outside of the boiler for a longer period of time and will return to the boiler with a greater difference in temperature from when it left. Of course, to be factored in is also the temperature drop of the room due to weather, insulation, size of piping, radiators, etc.

Currently, no systems or devices maintain the ideal temperature differential inside of a boiler. This is what the current invention sets out to do. To maintain the ideal difference in temperature, the current invention utilizes the laws of thermodynamics and two temperature transducers. The improved system described in this teaching is schematically and most simply illustrated in FIG. 2. As the Figure shows, a pair of temperature transducers 160 and 170 are placed preferably at or near the boiler's discharge and inlet or return piping. The temperature transducers will sense the temperature of the water on the outside of the piping or on the inside of the piping and provide an electrical signal proportional to the temperature to the PLC 180. The temperature transducer 170 on the return piping will measure the temperature of the water as it returns to the boiler. This is when the water is the coolest (or warmest if the system is cooling a building) because this water will have spent the longest amount of time outside of the boiler. The temperature transducer 160 is placed on the exit piping and will measure the temperature of water as it is leaving the boiler 110. This is where the water is the hottest (or coolest if the system is cooling a building) because this water has spent the shortest amount of time outside of the boiler and, of course, the water has just passed through the higher heat of the boiler. Since the transducers are located just outside the boiler, a PLC, provided with the signals from the transducers, will be able to calculate the difference between the temperatures of water entering and exiting the boiler, or said in another way, the difference between the hottest and coldest temperatures that the water in the system reaches.

The temperature transducers 160 and 170 communicate the temperature and electric signals, i.e., the data to a pump logic control ("PLC") 180. The system is therefore able to sense and provide data from the temperature transducers to the PLC 180—the signals representing the difference in temperatures within the boiler. Using this information the system will compare the differences in the temperatures to pre-installed information concerning the efficiency of the pump(s) and whether the pump(s) is(are) working too quickly, too slowly, or at just the proper speed (at the proper frequency) for efficiency. For example, if the water entering the boiler has not had enough time to change temperatures since leaving the boiler, the return temperature will be too close to the boiler exit temperature. A temperature too similar to the temperature of the water in the boiler will mean that the pump is pumping too quickly. On the other hand, if the temperature of the return water into the boiler is very far from the temperature of the water inside the boiler (greater than 20 degrees of F) the water has spent too much time outside of the boiler and the pump is working too slowly.

In the present invention, the PLC is also in electronic communication with pump 120. As mentioned, these pumps may be and are preferably VFDs and, where more than one pump is provided, they are controlled by PLC to operate at the maximum efficiency of the several pumps. This way, the system can alter the flow of the pump(s) in connection with the data the temperature transducers provide, increasing the pump flow (by increasing the frequency of the electric power provided to the pump(s) if the temperature differential is too large or decreasing the flow or frequency of the electric power if it is too small). The system therefore ensures that the boiler is running at peak efficiency, the pump(s) and by doing so, greatly improves the system's overall energy consumption.

Once the temperature differential has been determined based on signals received by the two temperature transducers, and transmitted to the PLC, the system can benefit from that information in a number of other ways as well. For example, in some embodiments of the invention, the ideal temperature differential can be changed. In others, the system and controlling PLC can be programmed to react differently at different intervals. For example, in a traditional heating and cooling system, the pump is either on, meaning that the desired temperature has not be reached, or it is off, meaning that the building interior is at the desired temperature and no heating or cooling is necessary. However, as the temperature reaches the desired temperature, the pump does not need to work as hard. Therefore, in one embodiment of a present invention, the pump can be a VFD and the electric current's frequency dropped so that the pump operates in a most efficient range, i.e., the PLC is programmed to slow the VFD pump when the temperature is within a certain range of the desired temperature. Also, as mentioned, a set of pumps can be ganged together and their efficiency curves can be programmed into the PLC so that the temperatures sensed can be correlated to a frequency of maximum continued pumping efficiency of the several pumps, operating together.

In preferred embodiments, the PLC will increase or decrease pump flow by taking into account the flow curve of the specific pump or set of pumps. This is an important factor because the relationship between fluid or pump flow and pump frequency, and by extension energy consumption, is not linear. For example a given pump might produce 250 gallons per minute at 60 PSI and 60 hertz. It will produce a different amount at 59 hertz, however. As the hertz decreases, the pump will slow down, usually not linearly but exponentially. The exact correspondence between frequency of electric power and flow varies with each pump. Efficiency of the electric supply can thus be factored into the efficiency of the overall heating system. To determine the correct pump rate for a desired output, the present invention preferably involves a variable frequency drive or VFD pump. A VFD is a device that can adjust the flow of a pump based on the efficiency of the frequency to pump output. It is a curve, i.e., it is not necessarily a linear function. Using this information, the system is able to know the best frequency (for electrical conservation) for the desired pump flow and the PLC is able to alter the pump's frequency to reach this desired frequency. The ability of the present invention to take the pump efficiency as a function of frequency into account allows the system to run as efficiently as possible because it will then optimize not only the boiler, but the electricity operating the pump as well. With energy costs ever rising, this feature can be extremely valuable.

It will be understood by those of ordinary skill in the art that various additional changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. A method for heating an interior of a building, comprising the steps of:

providing a heating mechanism in the form of a fluid boiler for heating a fluid;

providing a fluid in a closed loop of piping in the interior of the building for circulating the fluid from said boiler, through said closed loop of piping, and back to said boiler such that said fluid within said closed loop of piping passes within said interior of the building, said closed loop of piping passing into, within and out through said boiler, a fluid entry point of said closed loop of piping into said boiler being a fluid inlet and said fluid exit point of said closed loop of piping from said boiler being a fluid outlet;

providing and controlling at least one variable frequency drive (VFD) fluid pump for driving said fluid from said fluid outlet through said closed loop of piping to said fluid inlet and then through said boiler for heating of said fluid, an electrical frequency of driving said pump corresponding to an efficiency level of pumping said fluid by said pump and a speed of pumping said fluid through said closed loop of piping, monitoring temperature of said fluid at least at two points along said closed loop of piping, one point located adjacent the fluid inlet and the second point being adjacent the fluid outlet;

adjusting the electrical frequency of said pump(s) to maintain a difference in temperature of said fluid at said fluid outlet and said fluid inlet of about 20 degrees C.; and operation of said at least one pump is controlled by a PLC (programmable logic controller) which is pre-programmed with data input corresponding electrical frequency and operating efficiency of said pump(s) and said PLC is programmed to operate to maximize efficiency of said heating mechanism.

2. A method as claimed in claim 1 wherein temperature transducers at said fluid outlet and said fluid inlet are provided to sense and provide signals to said PLC based on the temperature difference between said fluid at said fluid outlet and said fluid inlet.

3. A method for cooling an interior of a building, comprising the steps of:
   providing a cooling mechanism in the form of a fluid chiller for cooling a fluid;
   providing a fluid in a closed loop of piping in the interior of the building for circulating the fluid from said chiller, through said closed loop of piping, and back to said chiller such that said fluid within said closed loop of piping passes within said interior of the building, said closed loop of piping passing into, within and out through said chiller, a fluid entry point of said closed loop of piping into said chiller being a fluid inlet and said fluid exit point of said closed loop of piping from said chiller being a fluid outlet;
   providing and controlling at least one variable frequency drive (VFD) fluid pump for driving said fluid from said fluid outlet through said closed loop of piping to said fluid inlet and then through said chiller for cooling of said fluid, an electrical frequency of driving said pump corresponding to an efficiency level of pumping said fluid by said pump and a speed of pumping said fluid through said closed loop of piping,
   monitoring a temperature of said fluid at least at two points along said closed loop of piping, one point located adjacent the fluid inlet and the second point being adjacent the fluid outlet;
   adjusting the electrical frequency of said pump(s) to maintain a difference in temperature of said fluid at said fluid outlet and said fluid inlet of about 20 degrees C.;
   operation of said at least one pump is controlled by a PLC (programmable logic controller) which is pre-programmed with data input corresponding electrical frequency and operating efficiency of said pump(s) and said PLC is programmed to operate to maximize efficiency of said cooling mechanism.

4. A method as claimed in claim 3 wherein temperature transducers at said fluid outlet and said fluid inlet are provided to sense and provide signals to said PLC based on the temperature difference of said fluid at said fluid outlet and said fluid inlet.

\* \* \* \* \*